United States Patent [19]

Bowman

[11] Patent Number: 4,709,485
[45] Date of Patent: Dec. 1, 1987

[54] SHAFT ALIGNMENT METHOD AND APPARATUS

[75] Inventor: Donald E. Bowman, Joliet, Ill.

[73] Assignee: Mobil Oil Corporation, New York, N.Y.

[21] Appl. No.: 937,808

[22] Filed: Dec. 4, 1986

[51] Int. Cl.$^4$ ............................ G01B 5/25; G01B 7/31
[52] U.S. Cl. ......................................... 33/228; 33/286; 33/661
[58] Field of Search ................. 33/228, 286, 412, 533, 33/550, 661, 645, 655, DIG. 21; 356/153

[56] References Cited

U.S. PATENT DOCUMENTS

| | | | |
|---|---|---|---|
| 4,033,042 | 7/1977 | Bently | 33/661 |
| 4,115,925 | 9/1978 | Malak | 33/661 |
| 4,161,068 | 7/1979 | McMaster | 33/645 |
| 4,367,594 | 1/1983 | Murray, Jr. | 33/661 |
| 4,516,328 | 5/1985 | Massey | 33/181 |
| 4,586,264 | 5/1986 | Zatezalo | 33/645 |

OTHER PUBLICATIONS

Ludeca, Inc.—Pruftechnik—Dieter Busch+Partner GmbH & Co., "Optaliga Operating Instructions", Jan. 1985, pp. 1-35.

Primary Examiner—Richard R. Stearns
Attorney, Agent, or Firm—Alexander J. McKillop; Michael G. Gilman; Malcolm D. Keen

[57] ABSTRACT

A cylindrical alignment housing is fixed to a housing of one of two axially aligned items of equipment. A cylindrical bearing housing is concentrically positioned around the cylindrical alignment housing, such that the cylindrical bearing housing is rotatably supported at a given position on the cylindrical alignment housing, which is fixed to the housing of the aforesaid one item of equipment. A mechanical coupling is provided between the bearing housing and the shaft of the other of the two equipment items that the bearing housing and the shaft will rotate in concert. A laser is positioned on the rotatable bearing housing and a prism is positioned on the other of the two items of equipment. The cylindrical bearing housing and the shaft of the aforesaid other equipment item are rotated together in concert, and measurements are taken using the laser and prism to determine whether the shafts are properly aligned with each other.

19 Claims, 11 Drawing Figures

SHAFT ALIGNMENT METHOD AND APPARATUS

BACKGROUND OF THE INVENTION

1. Field of the Invention

This invention relates to a shaft alignment method and apparatus, and more particularly, to method and apparatus for use in alignment of shafts along a common center line, e.g., where the shafts are associated with two pieces of rotating equipment adapted to be coupled together in driving relationship with one another.

2. Discussion of the Prior Art

Generally, it is necessary to shut down the operation of axially coupled rotating items of equipment in order to align the shafts of the equipment items precisely along a common axis. This is disadvantageous because the alignment process is time-consuming and requires a long equipment shut-down time. Further, when the shafts are cold, their physical shape differs from when they are at operating temperatures, thus making it difficult to effect a proper alignment with the shafts not in operation which will yield a correct alignment of the shafts during operation thereof.

Although it is known to use a visual sighting technigue directly on the shafts themselves to effect alignment while one of the equipment items is kept running, e.g., by placing bench marks on both of the items of equipment and visually sighting down the shafts to determine if they are aligned, this technique does not provide high accuracy, and hence is unsuitable for systems requiring high precision alignment.

SUMMARY OF THE INVENTION

It is an object of the present invention to provide an improved shaft alignment method and apparatus which overcomes the above-noted disadvantages in the prior art.

More particularly, it is an object of the invention to provide a shaft alignment apparatus and method which is capable of performing highly precise alignment while one of the machines is running.

It is another object of the invention to provide an alignment apparatus which may be installed on a piece of equipment during a turnaround time thereof, e.g., when the equipment would be idled during a seasonal stopping period, and left thereon indefinitely for use in alignment of the shaft of the equipment with another piece of equipment to be axially coupled therewith, as necessary.

According to the present invention, an apparatus is provided for use in alignment of respective shafts of two items of equipment along a common center line. The apparatus includes a cylindrical alignment housing secured to a housing of one of the items of equipment in substantially concentric relation thereto, a cylindrical bearing housing substantially concentrically disposed around the alignment housing to be rotatably supported thereon, and a measuring means supported on the bearing housing and a shaft of the other of the items of equipment for determining whether the pair of shafts are aligned with each other.

Also according to the present invention, a method is provided of aligning respective shafts of two items of equipment along a common center line. The method includes securing a cylindrical alignment housing to a housing of one of the items of equipment, concentrically positioning a cylindrical bearing housing around the alignment housing, such that the bearing housing is rotatably supported on the alignment housing, supporting a measuring means on the bearing housing and a shaft of the other of the items of equipment, and rotating the bearing housing and the shaft of the aforesaid other of the equipment items and taking measurements with the measuring means to determine whether the shafts are properly aligned with each other.

Also according to the present invention, a method is provided of aligning, e.g., a main air blower and its associated shaft with a motor generator and its associated shaft, while the main air blower is operating. The method comprises removing a guard cover from the shaft of the main air blower during a turnaround period from the blower, securing a cylindrical alignment housing to a bearing housing of the main air blow during said turnaround period, and thereafter starting the main air blower. The time-consuming total alignment procedure can then be carried out with the main air blower in operation.

BRIEF DESCRIPTION OF THE DRAWINGS

The above and other objects, advantages and features of the present invention will be more fully understood when considered in conjunction with the following figures, of which:

FIG. 4a is an end view of an inner end cap of the apparatus of FIG. 1;

FIG. 4b is a view along section A—A of FIG. 4a;

FIG. 5b is a view along section B—B of FIG. 5a;

FIG. 6b is a view along section C—C of FIG. 6a;

FIG. 7b is a view along section D—D of FIG. 7a.

DETAILED DESCRIPTION OF THE INVENTION

Figure 1:
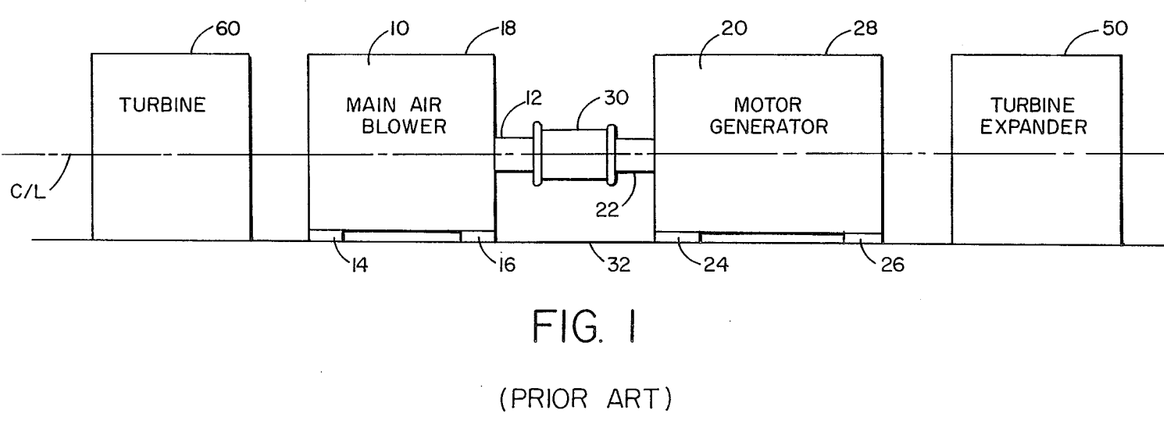
FIG. 1 illustrates a prior art system including axially aligned pieces of rotating equipment having their shafts coupled together.

FIG. 1 illustrates the general environment to which the present invention is applicable. FIG. 1 shows a main air blower 10 and a motor generator 20, with respective shafts 12 and 22 thereof coupled together by a coupling 30. Under operating conditions, the center lines of shafts 12 and 22 ideally will coincide precisely along center line C. When shafts 12 and 22 are cold, they will be slightly misaligned, but, due to physical changes when the pieces of equipment 10, 20 reach their operating temperatures, shafts 12 and 22 will pull into correct alignment during operation. Generally if a shaft alignment apparatus and/or technique determines that a misalignment exists between shafts 12 and 22, a correction may be made by one of many well known methods, such as by adding or removing shims 14, 16, 24, 26 to vary the clearance between main air blower 10 and motor generator 20 and surface 32 upon which they are mounted. Turbine 60 is used in association with main air blower 10, and turbine expander 50 is used with motor generator 20.

The present invention is illustrated in FIGS. 2–7b and is directed to a method and apparatus for use in the alignment of shafts along a common center line. In particular, the shafts can be associated respectively with two items of equipment adapted to be coupled together for operative rotation in driving relation with one another. In the embodiments described herein, a main air blower and a motor generator are selected only for illustrative purposes.

Figure 2:
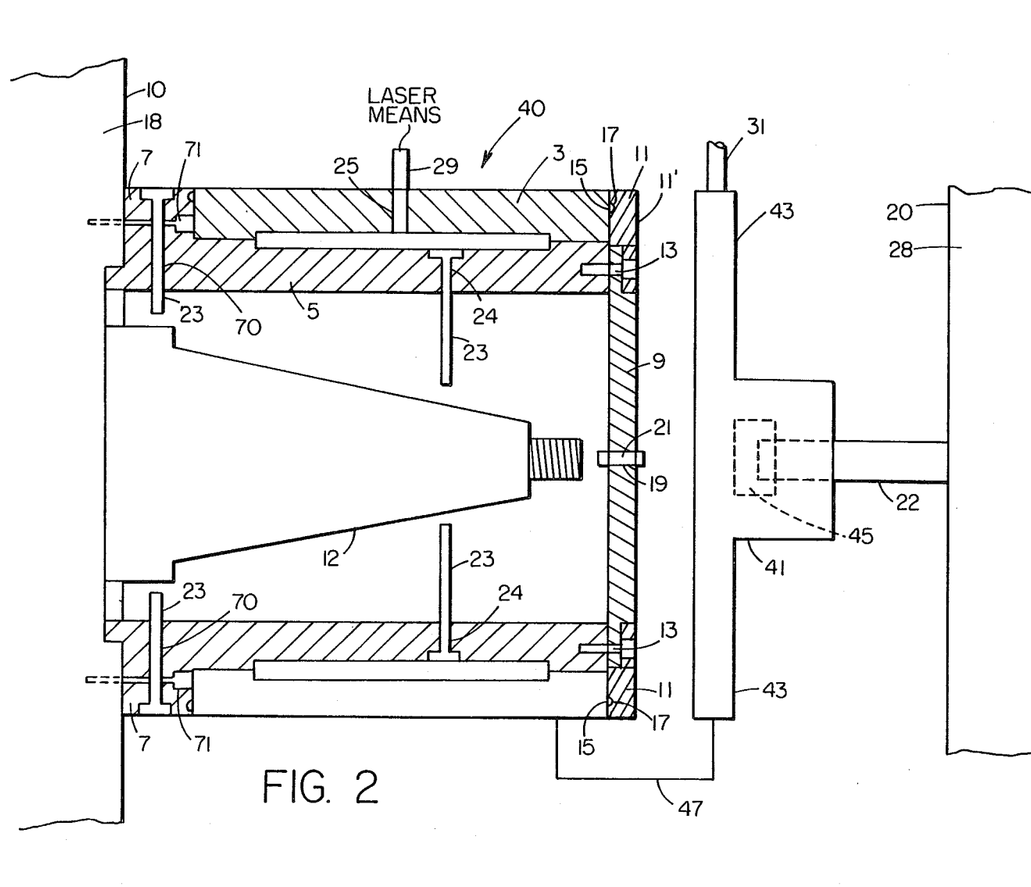
FIG. 2 is a partial sectional view which illustrates a shaft alignment apparatus according to the present invention.

FIG. 2 illustrates an alignment apparatus 40 in accordance with the present invention. Alignment apparatus 40 includes an alignment assembly, which comprises a cylindrical alignment housing 5 which is secured, via bolts 71, to a bearing housing 18 of main air blower 10 and extends over a space between main air blower 10 and motor generator 20, with shaft 12 of main air blower 10 extending a distance into alignment housing 5, as shown in FIG. 2. Alignment housing 5 is secured to housing 18 so that their center lines substantially coincide within acceptable tolerances. A cylindrical bearing housing 3 is positioned over alignment housing 5, with bearing housing 3 abutting against flange 7 on one axial end of alignment housing 5. It should be noted that the outer surface of cylindrical bearing housing 3 is centered at the center line of housing 18, also within the aforesaid acceptable tolerances. Alignment housing 5 and bearing housing 3 are preferably formed of a lightweight material, such as aluminum.

A plate-shaped inner end cap 9 is secured onto the other axial end of alignment housing 5 via tap screws 13. Annular outer end cap 11 fits over inner end cap 9 and is screwed onto this same axial end of alignment housing 5 through inner end cap 9, as shown in FIG. 2. An outer peripheral portion 11' of outer end cap 11 extends beyond the outer periphery of end cap 9 and abuts against one end surface of bearing housing 3 to assist in maintaining proper positioning of bearing housing 3 on alignment housing 5. O-ring 15 is positioned within annular groove 17 in this outer peripheral portion 11' of outer end cap 11. Bearing housing 3 is thus mounted on housing 5, such that it is free to rotate relative to stationary alignment housing 5. Alignment housing 5 is secured, e.g., bolted, onto cylindrical main air blower housing 18 via bolts 71, which pass through bores in flange 7 of cylindrical alignment housing 5.

A plurality of proximity sensors 23, e.g., Bently position probes, are positioned at the inner surface of cylindrical alignment housing 5 in order to measure whether shaft 12 of main air blower 10 is correctly centered within alignment housing 5, and hence also within housing 18 of main air blower 10, so that shaft 12 lies substantially on the coincident center lines of housings 5 and 18. A proximity sensor 21 is positioed in throughbore 19, located at a central portion of inner end cap 9, for measuring the distance beween the ends of main air blower shaft 12 and motor generator shaft 22 to provide a measurement of the C-dimension.

Figure 3:
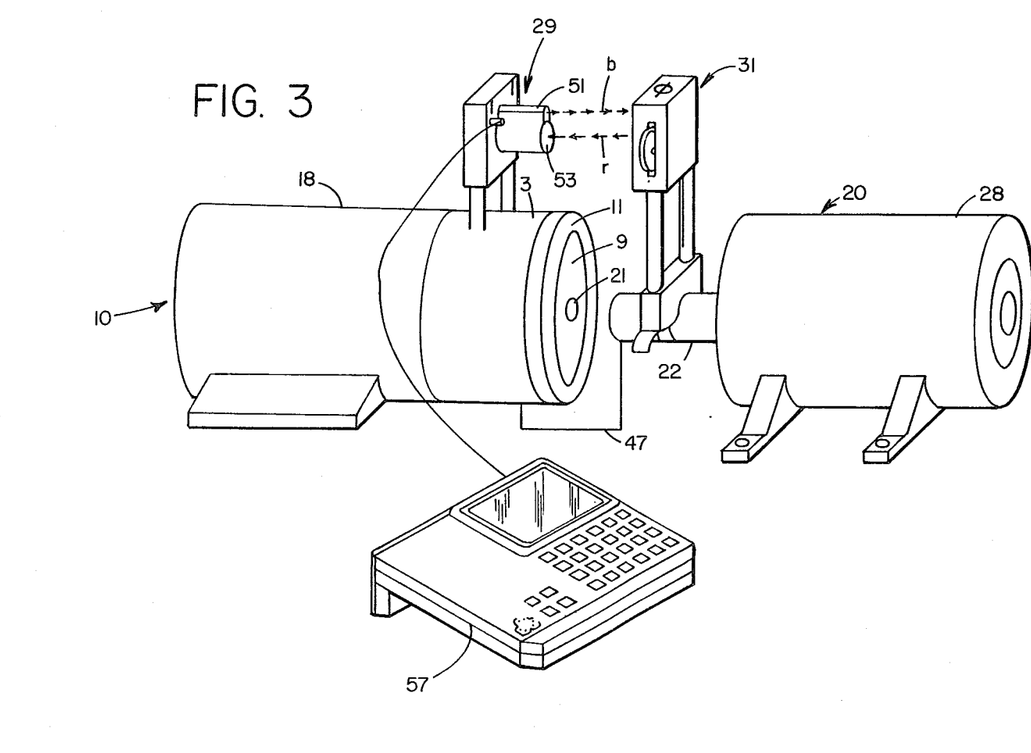
FIG. 3 illustrates the mounting of the measurement means according to the present invention.
Figures 4A, 5B:
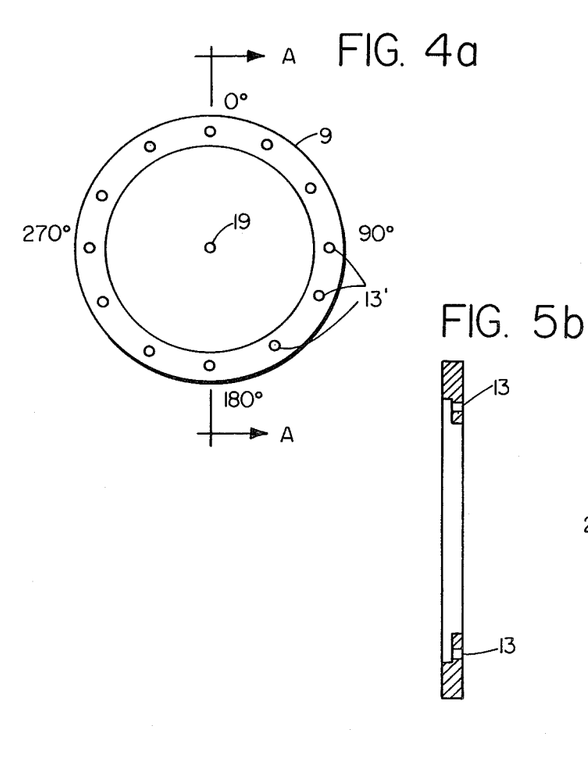
Figure 4B:
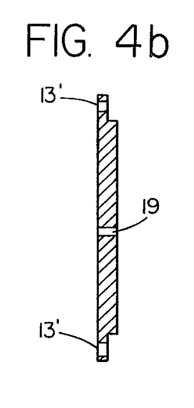
Figure 5A:
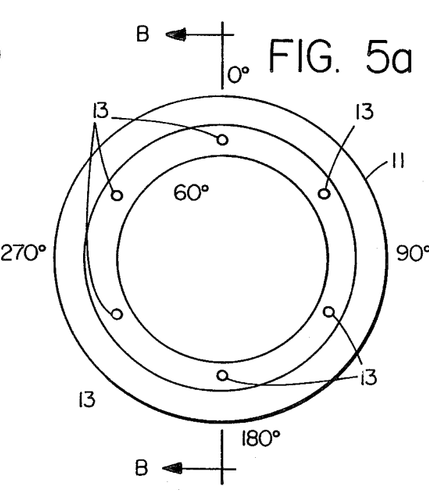
FIG. 5a is an end view of an outer end cap of the apparatus of FIG. 1.
Figure 6A:
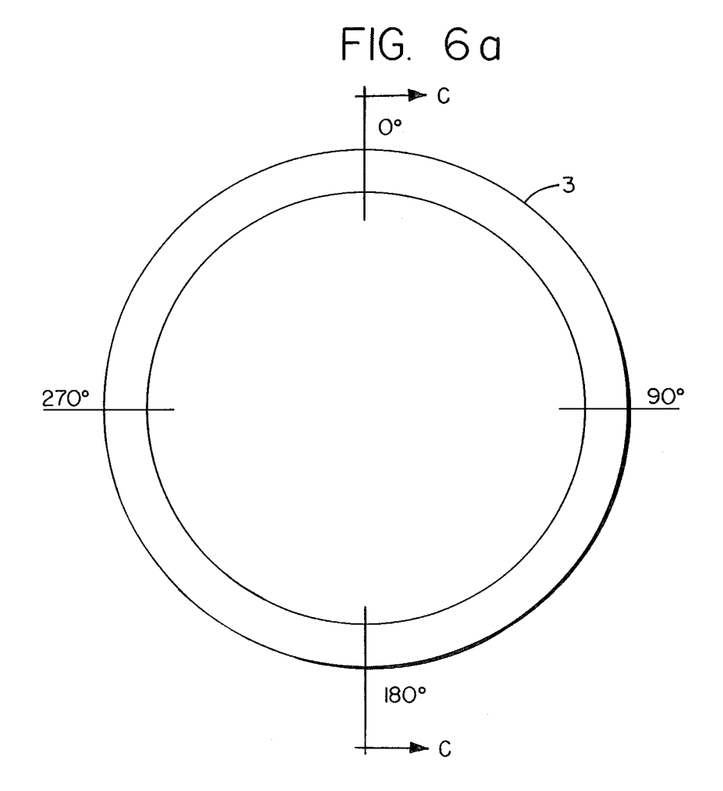
FIG. 6a is an end view of a bearing housing of the apparatus of FIG. 1.
Figure 6B:
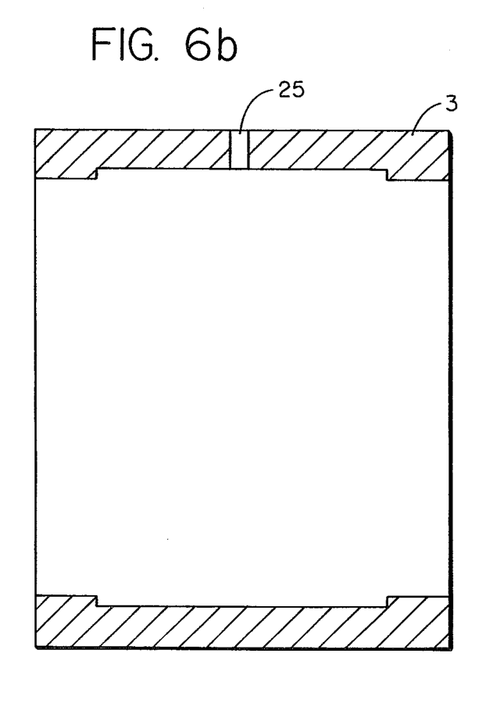
Figure 7A:
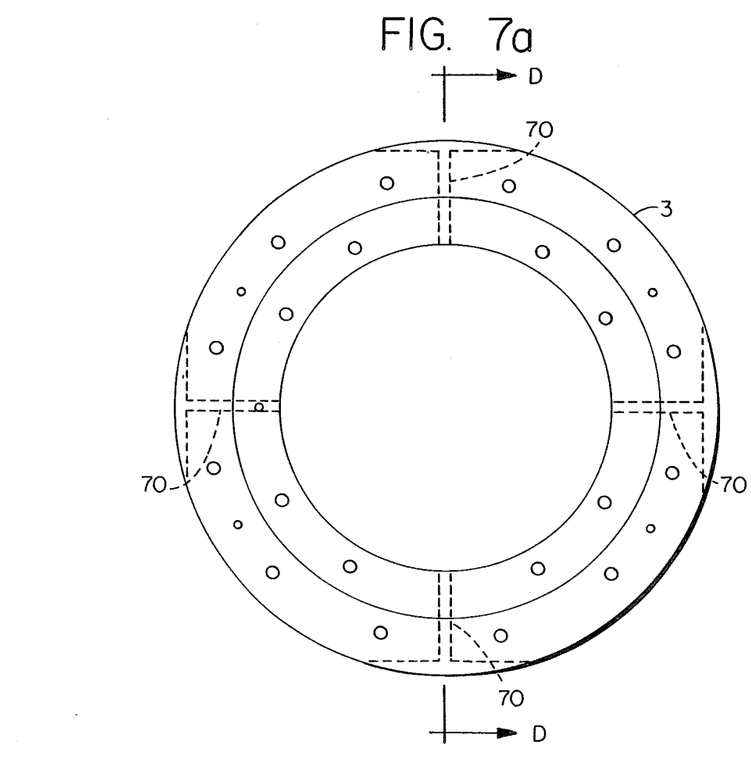
FIG. 7a is an end view of an alignment housing of the apparatus of FIG. 1.
Figure 7B:
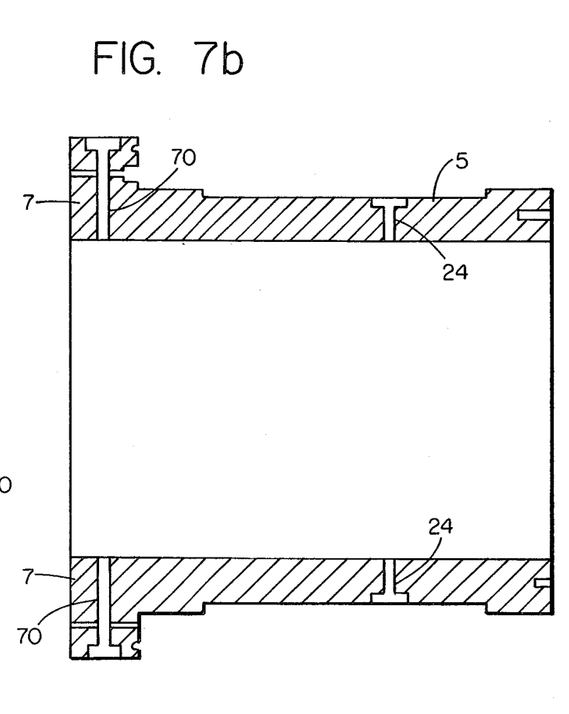

A laser means 29 (which includes a laser beam source and a reflected beam receiver comprising a detector means, as shown in FIG. 3) is positioned on bearing housing 3 in tap 25 thereof. Laser means 29 emits a beam toward motor generator 20. A prism means 31 is mounted on a flange 43 of coupling hub 41, which is removably attached via nut 45 to the end of shaft 22 of motor generator 20. The surface of flange 43, on which prism 31 is mounted, is parallel to shaft 22. Alternatively, prism means 31 can be mounted directly on shaft 22, as shown in FIG. 3; the critical requirement is that prism means 31 rotate in concert with shaft 22, bearing housing 3 and laser means 29. Prism means 31 receives the beam from laser means 29 and deflects it to a detection means, acting as a reflected beam receiver, to provide an indication of whether the main air blower 10 and motor generator 20, and their respective shafts 12 and 22, are properly aligned.

Mechanical coupling 47 couples bearing housing 3 with flange 43 of coupling hub 41 so that housing 3, with laser means 29 mounted thereon, is rotatable together with coupling hub 41 and motor generator shaft 22. Thus, an alignment using a technique such as a standard reverse dial indicator alignment technique can be used to determine what, if any, corrections in alignment must be made. Although the present embodiment illustrates a measuring means comprising laser means 29 and prism means 31, other types of measuring means, such as a measuring unit employing a standard dial indicator, such as that described in U.S. Pat. No. 4,516,328, can also be employed. The measurements are taken by rotating bearing housing 3 and shaft 22 of motor generator 20 together and taking readings at various angular locations to measure the position at which the reflected laser beam strikes the detection unit of the laser means. This technique is described in detail below. These readings can be taken either while bearing housing 3 and shaft 22 are being rotated or after they have been stopped at incremental angular locations. However, it should be apparent that the processing of the data from the readings, using conventional data processing techniques, will be greatly simplified if housing 3 and shaft 22 are stopped to take the readings. To provide highly accurate results, readings should be obtained at incremental locations for a full 360° rotation of bearing housing 3 and shaft 22. Data from these reading are then processed by a computer to determine what adjustments of the relative positions of main air blower 10 and motor generator 20 must be made to yield precise alignment of their respective shafts 12 and 22. As is well known, these adjustments are: height, side and distance between the ends of shafts 12 and 22. After the alignment procedure is completed, end caps 9 and 11 and bearing housing 3 are removed from alignment housing 5. Coupling 30, for connecting shafts 12 and 22, is then mounted, as shown in FIG. 1, in order to couple shafts 12 and 22 together to prepare the machines for operation. It should be noted that alignment housing 5 can be left secured to housing 18 of main air blower 10 indefinitely, even after coupling 30 (see FIG. 1) has been installed on shafts 12 and 22.

Further, in systems in which a piece of equipment remains in operation without stopping over long periods of time (e.g., as is generally the case with a main air blower in an oil refinery), but is idled for a relatively short period of time during, e.g., a major turnaround period in an oil refinery, this turnaround time is generally shorter than the time required to perform an alignment of the equipment with another item of equipment. Thus, to perform this alignment during this turnaround time would disadvantageously require the main air blower to be shut down for a longer than usual turnaround period. However, in accordance with the present invention, alignment housing 5 can be installed on main air blower housing 18 during the turnaround period without prolonging this period, then operation of main air blower 10 can resume on schedule and the time-consuming alignment of shafts 12 and 22 can be carried out with main air blower 10 in operation. This is because, with alignment housing 5 already installed on housing 18 of blower 10, bearing housing 3 and end caps 9 and 11 can then be mounted on alignment housing 5 while main air blower 10 is running. Then, motor generator 20 can be installed and its shaft 22 aligned with shaft 12 of main air blower 20, without stopping operation of blower 10.

Alternatively, cylindrical alignment housing 5 could be mounted on housing 28 of motor generator 20 so that the roles of main air blower housing 18 and motor generator housing 25 could be reversed in the above description if, for some reason, it was desired to align the shafts without stopping motor generator 20.

Cylindrical alignment housing 5 includes a flange 7 on one end thereof, against which a corresponding end of cylindrical bearing housing 3 is disposed. A cap means, comprising, e.g., inenr end cap 9 and outer end cap 11, is secured at the other end of cylindrical alignment housing 5. Outer end cap 11 includes an extending portion 11' which extends radially outwardly from the aforesaid other end of cylindrical alignment housing 5, such that cylindrical bearing housing 3 is held between flange 7 and this extending portion 11' of the cap means such that it can rotate around alignment housing 3.

The method of the present invention for alignment respective shafts of two items of equipment along a common center line includes fixing cylindrical alignment housing 5 to housing 18 of main air blower 10. Thereafter, cylindrical bearing housing 3 is concentrically positioned around cylindrical alignment housing 5, such that cylindrical bearing housing 3 is rotatably supported at a given position on cylindrical alignment housing 5. Inner and outer end caps 9 and 11, respectively, are then secured to an end of cylindrical alignment housing 5, as shown in FIG. 2. Then, a measuring means comprising, e.g., a laser means 29 and a prism means 31, is positioned on cylindrical bearing housing 3 and flange 43 of coupling hub 41 which is secured to shaft 22 of motor generator 20. Motor generator shaft 22 is coupled to bearing housing 3, e.g., via coupling hub 41 and mechanical coupling 47, to rotate in concert therewith. Finally, cylindrical bearing housing 3 and shaft 22 are rotated and measurements are taken using the measuring means to determine whether the shafts are properly aligned with each other. The preferred technique for taking these measurements is in accordance with a standard reverse dial alignment technique, as illustrated in U.S. Pat. No. 4,516,328, the disclosure of which is hereby incorporated by reference.

The measurement technique can be readily understood with reference to FIG. 3. According to the invention, a laser beam b, as shown in FIG. 3, is emitted from laser means 29 which constitutes a laser 51 and a detector 53 unit, which is mounted on bearing housing 3 attached to housing 18 of main air blower 10. Detector 53 is, e.g., a high resolution, biaxial, analog photo-electric semiconductor position detector. Beam b is aimed at prism means 31 mounted on shaft 22 of motor generator 20. Reflected beam r is reflected back into detector 53 of laser means 29. It should be noted that it is conventional to mount a laser/detector unit on the stationary shaft of one machine and to mount a prism on the shaft of the machine to be aligned with the stationary machine such as is described in *Optalign Operating Instructions,* Ludeca, Inc., January, 1985, the subject matter of which is hereby expressly incorporated by reference.

However, this conventional technique requires both machines to be turned off. The present invention, on the other hand, is directed to an improvement in which the shaft of one machine can be kept in operation during the alignment procedure, because the laser/detector unit is not mounted directly on the shaft, but instead it is mounted on the alignment apparatus 40 according to the present invention. However, as used with the system of the present invention, the fundamental operation of the laser/detector unit and the prism unit is the same as in the conventional system.

As seen in FIG. 3, prism means 31 reflects the beam along path r in a plane parallel to that in which it receives the beam. When the position of prism 31 shifts during rotation, the spacing between the beams alters if the two shafts are offset from one another. From this difference, the parallel offset of the shafts can be detected. In a different plane, prism means 31 acts as an ordinary mirror, reflecting the entering beam at an angle. As prism 31 is rotated, this angle between the entering beam and the reflected beam varies, permitting annular misalignment to be measured.

During a measuring operation, bearing housing 3 and motor generator shaft 22, which are coupled via mechanical coupling 47, are rotated in concert. Preferably, at each of four positions, i.e., $0\sqrt{}$, 90°, 180° and 270°, the coordinants at which reflected beam r strikes detector 53 are entered into computer 57, which calculates the alignment correction values from the conveyed coordinants. It should be noted that detector 53 is preferably operated within a linearized range, although linearization factors can be stored in computer 57, to provide compensations for non-linear detector panel regions.

If a misalignment between shafts 12 and 22 exists, the reception coordinates, i.e., the coordinates in detector 53 at which the reflected laser beam is received, will vary when bearing housing 3 and shaft 22 are rotated in concert. These changes permit calculation of the actual alignment configuration. These calculations are performed by computer 57 which, e.g., automatically computes the correction values for moving the machine, in this case, motor generator 20, to effect proper alignment. I.e., the system takes measurements to determine the relative positions of the shafts. These measurements are then converted into correction values for the machines, defining how much to move them vertically and horizontally. If it is determined that a misalignment exists, correction may be achieved by, e.g., adding or removing shims to vary the clearance between main air blower 10 and/or motor generator 20 and a surface upon which they are mounted, as described above in connection with FIG. 1.

The alignment technique according to the present invention eliminates the need for the existing main air blower train to be shut down for final alignment. In, e.g., an oil refinery using a main air blower which operates continuously over long time periods, the present invention also enables installation of the motor generator and expander turbine and alignment thereof with the main air blower between a major turnaround point and a subsequent coupling of the complete train. The procedure according to the present invention is applicable to any type of operating equipment and can be performed while the equipment is operating. Thus, significant cost and time savings will result.

To retrofit an existing main air blower train (or other equipment train) with the apparatus of the present invention, the following technique, according to the present invention, is provided. First, the shaft cover is removed from shaft 12 of main air blower 20. Then, alignment housing 5 is attached to housing 18 of main air blower 10; housing 5 must be installed parallel to shaft 12, preferably, e.g., within 0.001" of the center line of shaft 12. A plurality of position or proximity sensors or probes 23 are disposed in an inner peripheral surface of alignment housing 5 to be used to take into account growth and lift of shaft 12, while main air blower 10 is running, to determine if shaft 12 is sufficiently centered within alignment housing 5, and hence housing 18 of main air blower 10, to meet the required tolerances. Next, the turbine and main air blower are restarted, and motor generator 20 and turbine expander 50 are positioned for installation. Laser means 29 is positioned on rotatable bearing housing 3, and prism means 31 is positioned on flange 43 of coupling hub 41 or, alternatively, directly to shaft 22. Now, the alignment procedure can be performed in accordance with a standard reverse dial indicator alignment. Thus, bearing housing 3 and motor generator housing 28 are rotated in concert, and preferably stopped, at incremental angular locations to simplify processing of the data from the readings. At each angular location, laser means 29 emits a beam which is reflected back by prism means 31 toward detector 53 on a beam receiver associated with the laser means. Readings are obtained at these incremental locations for a full 360° rotation of bearing housing 3, coupling hub 43 and motor generator shaft 22. Then, computer 57 analyzes the data from the readings to determine what, if any, alignment adjustments must be made between shafts 12 and 14. Next, once the proper alignment is achieved, motor generator housing 28 is grouted. The alignment is then rechecked, again in accordance with a standard reverse dial indicator alignment, and final position adjustments are made. This ensures that when main air blower 10 and motor generator 20 are shut down, and coupling 30 is installed between shafts 12 and 14, very little further alignment adjustment will be necessary, thus requiring only a very short down time for main air blower 10 during this final coupling operation.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

I claim:

1. An apparatus for use in alignment of respective shafts of two items of equipment along a common center line, comprising:
   (a) a cylindrical alignment housing including means for mounting it on a housing of one of said items of equipment in substantially concentric relation to the shaft of the equipment item,
   (b) a cylindrical bearing housing substantially concentrically disposed around said alignment housing and rotatably supported thereon, and
   (c) measuring means supported on said bearing housing and a said shaft of the other item of equipment for determining whether said shafts are aligned with each other.

2. The apparatus of claim 1, further comprising coupling means for coupling said bearing housing and said shaft of said other item of equipment to each other to cause them to be rotatable in concert together.

3. The apparatus of claim 1, wherein said measuring means comprises (i) a laser means secured to said bearing housing, said laser means comprising a position detector means, and (ii) a prism means supported on said shaft of said other of said items of equipment, said laser means for emitting a laser beam toward said prism means, which beam is reflected back by said prism means to impinge on said detector means, said detector means providing an indication of a position at which said beam impinges thereon to provide an indication of whether said shafts are aligned with each other.

4. The apparatus of claim 3, further comprising a coupling hub secured on said shaft of said other of said items of equipment, said prism means being mounted on said coupling hub, said coupling hub and said bearing housing being coupled to each other to cause them to be rotatable in concert together.

5. The apparatus of claim 3, whether said prism means is mounted directly on said shaft of said other of said items of equipment.

6. The apparatus of claim 1, wherein said measuring means comprises proximity sensing means disposed in said alignment housing for determining whether a said shaft of said one of said items of equipment is properly centered within said alignment housing.

7. The apparatus of claim 1, wherein said alignment housing comprises a flange which projects radially outwardly from one end of said alignment housing, and said apparatus further comprises cap means which includes an extending portion which extends radially outwardly from another end of said alignment housing, said bearing housing being positioned between said flange and said extending portion of said cap means.

8. The apparatus of claim 7, further comprising a proximity sensing means mounted in a throughbore in a central portion of said cap means for measuring a distance between ends of said shafts.

9. The apparatus of claim 7, wherein said cap means comprises a plate-shaped inner end cap which is secured onto said another end of said alignment housing and an annular outer end cap which fits over said inner end cap and is secured onto said another end of said alignment housing, and said outer end cap includes said extending portion which extends beyond an outer periphery of said inner end cap to abut against said opposite end of said bearing housing.

10. A method of aligning respective shafts of two items of equipment along a common center line, comprising:
   (a) securing a cylindrical alignment housing to a housing of one of said items of equipment,
   (b) positioning a cylindrical bearing housing around said alignment housing in substantially concentric relation therewith, such that said bearing housing is rotatably supported on said alignment housing,
   (c) supporting a measuring means on said bearing housing and a said shaft of the other of said items of equipment, and
   (d) rotating said bearing housing and said shaft of said other of said items of equipment in concert and taking measurements with said measuring means to determine whether said shafts are properly aligned with each other.

11. The method of claim 10, further comprising coupling said bearing housing and said shaft of said other of said items of equipment to each other to cause them to rotate in concert together.

12. The method of claim 10, wherein step (d) comprises taking measurements with said measuring means at incremental angular locations for a full 360° rotation of said bearing housing and said shaft of said other of said items of equipment.

13. The method of claim 10, wherein step (c) comprises mounting a laser means on said bearing housing, said laser means comprising a position detection means, supporting a prism means on said shaft of said other of said items of equipment, and causing said laser means to emit a beam toward said prism means, which beam is reflected back by said prism means to impinge on said detection means, said position detection means providing an indication of a position at which said beam impinges thereon to provide an indication of whether said shafts are aligned with each other.

14. The method of claim 13, further comprising securing a coupling hub on said shaft of said other of said items of equipment and coupling said bearing housing and said shaft of said other of said items of equipment to cause them to rotate in concert together, and wherein step (c) comprises mounting said prism means directly on said coupling hub.

15. The method of claim 13, wherein step (c) comprises mounting said prism means directly on said shaft of said other of said items of equipment.

16. The method of claim 10, further comprising mounting a cap means on one end of said alignment housing, positioning a proximity sensing means in a throughbore in a central portion of said cap means, and taking measurements with said proximity sensing means to measure a distance between ends of said shafts.

17. The method of claim 10, further comprising mounting a proximity sensing means in said alignment housing and taking measurements therewith to determine whether a said shaft of said one of said items of equipment is properly centered within said alignment housing.

18. A method of aligning respective shafts of two items of equipment along a common center line, comprising:
  (a) removing a shaft guard from a shaft of one of the items of said equipment,
  (b) securing a substantially cylindrical alignment housing to a bearing housing of said one item of equipment,
  (c) concentrically positioning a rotatable cylindrical bearing housing around the alignment housing while the item of equipment is running,
  (d) supporting a measuring means on the rotatable bearing housing and on a shaft of the other item of equipment,
  (e) rotating the rotatable bearing housing and the shaft of the other item of equipment together and
  (f) taking measurements with the measuring means to determine whether the shafts are properly aligned with each other.

19. The method of claim 18, further comprising coupling said rotatable bearing housing and said shaft of said other item of equipment to cause them to rotate together in concert.

* * * * *